Nov. 23, 1954  N. ANDREW ET AL  2,695,183
CONNECTOR FOR FLEXIBLE TUBING
Filed Sept. 5, 1950
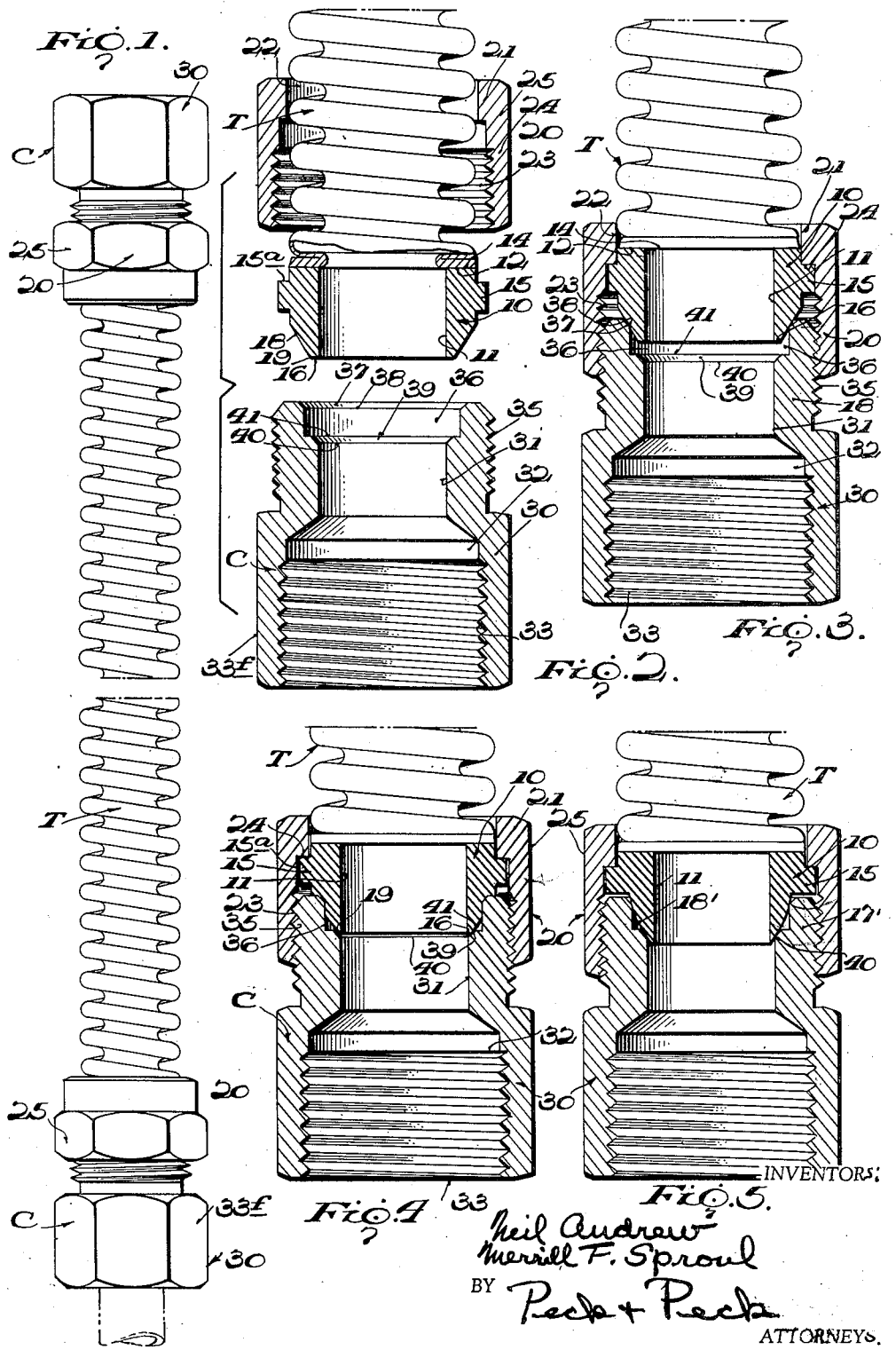
INVENTORS:
Neil Andrew
Merrill F. Sproul
BY Peck + Peck
ATTORNEYS.

United States Patent Office 2,695,183
Patented Nov. 23, 1954

2,695,183

CONNECTOR FOR FLEXIBLE TUBING

Neil Andrew, New Rochelle, N. Y., and Merrill F. Sproul, Tenafly, N. J., assignors to Packless Metal Hose, Inc., a corporation of New York Application September 5, 1950, Serial No. 183,151

8 Claims. (Cl. 285—87)

The invention relates to connectors or couplings for flexible tubing; and the nature and objects of the invention will be readily understood by those skilled in the art in the light of the following detailed description and explanation of the accompanying drawing illustrating what we at present consider to be the preferred embodiments or mechanical expressions of the several features of our invention from among various other embodiments, mechanical expressions, forms, arrangements, designs, and combinations, of which the invention is capable and adapted within the broad spirit and scope thereof as defined by the appended claims.

It is an object of our invention to provide an improved connector or coupling particularly adapted for connecting a flexible tube to a rigid or non-flexible tube or fitting.

Another object is to provide such a connector of the union type to eliminate the application of torsional loads and forces to a flexible or other type of tube to be coupled by the connector.

Another object is to provide a connector having a primary or first-line seal formed therein when the connector is brought into assembled, coupled relation, and a secondary or reserve seal which is formed and made effective within the connector automatically in the event of excessive wear in the primary seal or of disruption of the primary seal by the application of excessive forces to the connector in initially assembling the connector into coupled relation.

A further object is to provide such a connector which is particularly adapted for mounting on a flexible tube of the corrugated, thin-walled type formed of metals, plastics or materials of similar structural characteristics.

Another object is to provide such a connector or coupling which will form a gas- and liquid-tight connection when in assembled, connected relation.

A further object is to provide a form of such a connector having primary and secondary seals in which both seals are established and rendered effective contemporaneously by the initial assembly of the connector into operative coupled relation to thus form a double seal.

Another object is to provide a design and construction for such a tube connector in which the primary and secondary seals are formed by annular sealing edges within and spaced axially of a coupling member for engagement by a sealing ring fixed on the end of a tube.

And a further object is to provide such a connector which is adapted to form the coupling components at opposite ends of a length of corrugated flexible tubing for use as the connector between a rigid, fixed position gas supply pipe and the intake pipe or fitting of a gas appliance.

With the foregoing general objects, features and results in view, as well as certain others which will be readily recognized from the following detail description, our invention consists in certain novel features in design and construction of parts and elements and in the combinations and sub-combinations thereof, all as will be more fully referred to and specified hereinafter.

Referring to the accompanying drawings in which similar reference characters refer to corresponding parts and elements throughout the several figures thereof:

Fig. 1 is a view in side elevation of a flexible tube connector having at the opposite ends thereof connectors of our invention providing the coupling components for the tube.

Fig. 2 is a view in longitudinal section through one of the connector components of Fig. 1, with the parts thereof in disassembled relation, the end of the flexible tube with which such connector is associated being shown in side elevation.

Fig. 3 is a longitudinal sectional view similar to Fig. 2 but showing the parts of the connector in assembled coupled relation with the primary or first-line seal established.

Fig. 4 is a view similar to Fig. 3 but showing the coupling with the parts thereof in position with the secondary or reserve seal formed and established.

Fig. 5 is a view in longitudinal section through another form of connector of our invention by which a double seal is established upon initial assembly of the connector into operative relation, the end of a flexible tube on which this form of connector may be mounted being shown in side elevation.

We have selected as an example of our invention for purposes of illustration and explanation, a form of connector particularly adapted for use as the coupling component of a flexible tube type of gas connector for connecting the intake fitting of a gas appliance with a rigid gas supply pipe. This example form of connector has been selected primarily because of the exacting conditions which a connector for this purpose must meet and efficiently overcome in maintaining a gas-tight and leak-proof coupling and connection between the ends of the flexible tube and the supply pipe and the appliance intake fitting. It is to be understood, as will be readily recognized by those familiar with the art, that the seal-forming, leak-proof connectors of our invention are capable of and adapted to use generally for the efficient coupling or connecting of any types or characters of tubing or piping together, or for connecting a tube or pipe to various types of fittings, particularly where it is desired to obtain a liquid- and gastight connection.

A form of so-called gas connector utilizing as coupling components connectors embodying our invention, is illustrated in Fig. 1 of the drawings. This connector has met with successful commercial use for connecting a gas appliance, such as a gas stove, to a rigid, fixed position gas supply pipe. With this connector unit it is possible to readily couple up and connect a gas appliance to the supply pipe without the necessity of accurately fitting and joining rigid pipe sections in order to connect the supply pipe with the appliance. After the connection is made the gas appliance can be readily moved within a range of movements determined by the length of the flexible connector, or the appliance can be readily uncoupled and disconnected and recoupled when desired. By the use of connectors of our invention as the coupling components for the connector unit, gas tight connection is assured under all normal conditions of connection and of operation and use, including frequent disconnection and recoupling of the connectors.

The flexible connector as shown in Fig. 1, comprises a length of corrugated, flexible tubing T, which in this example happens to be of the thin walled, spirally corrugated flexible type formed of metal, such as one of the brasses, which will be flexible but not resilient so as to retain the various positions to which it may be bent or flexed in installation and use. At its opposite ends the flexible tube T is provided with identical connectors of our invention. Each connector includes, referring to Fig. 3, in connection with Fig. 1, a preformed substantially rigid sealing ring or nose member 10 secured in fixed position on an end of tube T, a coupling sleeve or union member 20 freely confined on tube T for rotation thereon as well as movements axially therealong, and a coupling member C adapted to be secured on a supply pipe or an appliance intake fitting and to be threaded into coupling sleeve 20 for drawing the coupling member C into seal forming connection with the sealing ring or nose member 10.

In accordance with our invention the tube-mounted sealing ring or nose member 10 is comprised by an annulus body providing therethrough an axial flow passage or bore 11. The passage or bore 11 is of constant diameter throughout its length and, in this instance, such diameter is slightly greater than the minimum effective internal diameter of the flexible tube T (see Fig. 2). At its inner end sealing ring 10 is provided with an annular, flat seating surface 12 disposed in a plane normal or perpendicular to the axis of the member. The end of the corrugated tube T to which a sealing ring 10 is to be attached and secured, has the end corrugation or corrugations mashed or displaced inwardly of the tube to provide at the outer end of the tube an annular, flat seating surface 14 therearound disposed in a plane perpendicular to the axis of the tube.

The sealing ring 10 is mounted on the tube end by seating the annular flat surface 12 of the ring on and against the annular flat seating surface 14 formed on the outer end of the tube, with the ring member being positioned in substantial axial alignment with the tube end and being extended outwardly therefrom in longitudinal, axial continuation thereof. So mounted and positioned, sealing ring 10 is then suitably fixed to the tube end in permanent connection therewith. In the example hereof, which assumes the flexible metal tube T to be formed of one of the brasses, the nose piece or sealing ring 10 is formed of tellurium brass, so that, the ring member 10 may be efficiently secured to the tube end by brazing. By using tellurium brass which will resist oxidation under the necessary brazing temperatures, a relatively clean surface will result, thus eliminating any necessity for cleaning and polishing operations on the sealing ring upon completion of the brazing thereof to the tube.

The body of the sealing ring 10 has a maximum external diameter substantially equal to the maximum effective external diameter of the corrugated tube T, and is provided with an annular flange or rib 15 extending externally therearound adjacent but spaced outwardly a distance from the inner end 12 of member 10 which is attached to the tube end. The outer end of the sealing ring 10 terminates in an annular, flat edge surface 16 therearound which is located in a plane normal to the axis of the ring member. The portion of the member 10 intermediate the annular outer end edge 16 and the annular rib 15 is formed of frustro-conical shape by an annular, inwardly beveled or inclined surface 18 which has an angle of inclination to the axis of the member 10 of sixty degrees (60°). In this instance, the conical surface 18 terminates at its inner edge spaced a distance outwardly from rib 15 and at its outer edge joins with the flat edge surface 16 to form and provide an annular edge 19 externally around the outer end of the sealing ring 10. This conical surface 18 forms and provides a seal forming surface for sealing engagement by annular sealing members, edges or ribs provided within a coupling member C, which provide the primary and secondary seals in accordance with our invention.

A coupling sleeve or union 20 is mounted and confined on tube T for operative rotative engagement with the external rib 15 of the sealing ring 10 fixed on an end of the tube. This sleeve 20 is formed at its inner end with a radially, inwardly extended flange 21 therearound having an axial opening or bore 22 therethrough of an internal diameter slightly greater than the maximum effective external diameter of tube T, so that the sleeve may be mounted on the tube with the tube extending through bore 22 with a free fit. The sleeve 20 may thus be rotated on and may be moved freely axially along the tube T. The union or coupling sleeve 20 is provided with internal screw threading 23 and an annular shoulder 24 is formed around the interior of the sleeve by the inner side of the radially inwardly extended flange 21 thereof.

The coupling sleeve or union 20 has a maximum internal diameter to freely pass over and receive therein the rib 15, and in mounted position, the union may be moved outwardly on the tube to an operative position over and receiving therein the sealing ring 10 with the internal shoulder 24 at the inner end of the sleeve rotatably abutting and engaged on the annular surface 15a provided by the inner side of rib 15. The coupling sleeve 20 is thus restrained against movement outwardly from its operative position engaged against rib 15. The coupling sleeve 20 may, as in the example hereof, be formed with a series of suitable external flats 25 thereon and therearound providing the usual tool engaging surfaces by which the sleeve may be rotated manually.

A coupling member or plug C is provided for operative association with sealing ring 10 and coupling sleeve 20, to effect the gas and liquid-tight connection of the tube T with another tube or fitting. In the example embodiment of connector of the invention, the coupling member C is formed as a generally cylindrical body 30 having formed therethrough a bore or fluid flow passage 31. Passage 31 has an internal diameter substantially equal to the internal diameter of the flow passage through the sealing ring 10. A counterbore 36 is formed in one end of body 30 in axial alignment with and forming an enlarged diameter continuation of passage 31, with this counterbore opening through the adjacent end of the body and being adapted to receive therein the conical portion 18 of the tube mounted nose piece 10. At the opposite end the body 30 is formed with an enlarged diameter counterbore 32 co-axial with and opening at its inner end into passage 31. The counterbore 32 forms an axial continuation of passage 31 and extends to and opens through the adjacent end of body 30. Counterbore 32 is formed with internal screw threading 33 to thus provide an internally threaded socket for attachment of the coupling to the pipe or fitting to which tube T is to be connected. The body 30 at the portion thereof forming the end of the body opposite counterbore 32 and surrounding passage 31, is formed of decreased external diameter and is provided with external screw threading 35 therearound. The external diameter of the screw threaded portion 35 is equal to the internal diameter of the screw threaded coupling sleeve 20, so that sleeve 20 can be threaded down onto the threading 35 of the coupling member body 30 to thus securely attach these two components together in assembled connector forming relation.

The body 30 surrounding the outer open end of the counterbore 36 is chamfered to provide an annular outwardly inclined flat surface 37 therearound having an angle of inclination of forty-five degrees (45°). There is thus formed an annular sealing edge or ridge 38 within and around the counterbore 36 adjacent the outer end thereof which constitutes a primary or first-line sealing edge or member of the connector. The body 30 around and between the inner end of counterbore 36 and the outer end of flow passage 31 is formed with a similar chamfer 39 concentric with chamfer 37 but of smaller diameter. This chamfer 39 provides an outwardly inclined annular surface which has an angle of inclination of forty-five degrees (45°) and which forms at the line of merger or joinder with the wall surrounding passage 31, the annular edge 40 with surface 39, and the annular edge 41 formed around the line of merger or joinder between surface 39 and the wall surrounding counterbore 36. Edges 40 and 41, together with surface 39, constitute elements making up the secondary or reserve seal for the connector.

The coupling member C may have the series of flats 33f formed on the exterior of the maximum external diameter portion of the body 30 for the ready application to the coupling member of a turning tool.

In the operation and use of the connector to couple a tube or pipe, such as the flexible tube T of the example, to another pipe, tube or fitting having an externally threaded end, the coupling member or plug 30 is first screwed on to such threaded end with such end received in the internally threaded socket formed by the enlarged diameter bore 32. The tube-mounted sealing ring or nose member 10 is then inserted in the counterbore 36 of coupling member C with the annular, inclined surface 18 of the conical nose portion of ring 10 engaged against and seated on the annular sealing edge or member 38 formed by the chamfer 37 within the counterbore 36 around the outer end thereof. The coupling sleeve or union 20 is then threaded over and onto the external threading 35 of the reduced diameter portion of body 30 with the shoulder 24 of the flange 21 having rotative bearing engagement on the outer side, annular seating surface 15a of rib 15 of sealing ring 10. Thus, continued threading of coupling sleeve 20 by rotating that sleeve on tube T, will draw sealing ring 10 and coupling member C together and force the annular sealing member or edge 38 into the conical surface 18 of the nose of the sealing ring. Preferably, as in the example hereof, the nose member or sealing ring 10 is formed of a material, in this instance tellurium brass, which is softer than the material of the coupling member body 30 which forms the sealing edge 38, in this instance free machining brass, so that edge 38 cuts or swages into the nosepiece to form therewith an effective gas and liquid-tight seal or joint therebetween, as clearly shown by Fig. 3.

Under some conditions of installation it is frequently found that the seal formed between conical surface 18 of the sealing ring 10 and the annular edge 38 provided by the coupling member C can be effectively established and made by manual threading of the coupling sleeve onto the coupling member C without the necessity of using a wrench or other turning tool. If, however, such a tool is used, and in the initial connection, excessive turning forces are used and the edge 38 is disrupted, as by flattening or swaging, so that the effectiveness of this primary or first-line seal is destroyed, then the conical nose of the sealing ring 10 will have been forced inwardly a sufficient distance to engage and establish an effective seal with the secondary or reserve sealing member constituted by chamfer 39 and the annular sealing edges 40 and 41.

As will be clear by reference to Fig. 3, the axial length and the external diameters of the conical nose portion of sealing ring 10 are such that when the connector is assembled into attached, coupling forming relation with the primary or first-line seal established and effective, the outer (inner) end of the ring is spaced from and has clearance with the secondary seal forming members 39–40–41. In such position the annular sealing edge or member 38 is engaged in complete seal forming contact with and around the conical surface 18 at a location intermediate the opposite end edges of that surface. When, however, the sealing ring 10 is forced a sufficient distance from its primary seal forming position, into the counterbore 36 of coupling member C, the annular edge 19 of the sealing ring will become engaged with and around the inclined surface or chamfer 39 to thereby establish and render effective the secondary or reserve seal, as will be clear by reference to Fig. 4. Axial movement of the sealing ring 10 into sealing engagement with the secondary seal forming surfaces 39–40–41 may be the result of excessive turning forces applied to coupling sleeve or union 20 in the initial or coupling connecting of the connector, so that, the conical nose portion is forced past and has sealing edge 38 embedded or forced a sufficient distance inwardly thereinto to permit such movements; or may be due to repeated connection and recoupling of the connector which cause the sealing edge 38 and engaged portions of conical surface 18 to become worn sufficiently to permit of such movement. But, in either event the members or surfaces 39–40–41 provide for the establishment of a secondary or reserve seal which is effectively gas and liquid-tight and which will thus maintain the leak-proof character of the connection and serve as a safeguard against failure of the primary or first line seal provided for by sealing edge 38.

Attention is here directed to the fact that if the sealing ring 10 is forced inwardly a sufficient distance after the establishment of the secondary seal by the engagement of edge 19 with chamfer surface 39, as shown in Fig. 4, then the conical nose-piece may assume a position in which the sealing edge 40 may engage and form an effective seal with the conical surface 18 of the nose-piece of sealing ring 10. From the broad standpoint our invention does not consider it to be critical as to which of the surfaces or members 39–40–41 are engaged by either the conical surface 18 or the annular edge 19 of the sealing ring. Basically, our invention is concerned with and consists in providing the secondary or reserve seal which can be engaged in sealing relation by the sealing ring in the event of certain conditions arising which disrupt and render less effective the primary or first-line seal, and to do this by providing primary and secondary seals spaced axially of the coupling member in the direction of normal axial movement of the sealing ring to and from connected seal forming, coupled relation.

We have shown in Figs. 2, 3 and 4, an example embodiment of a connector of our invention in which the outer sealing edge 38 of the coupling member C constitutes the primary or first-line seal or seating edge for engagement with the conical nose surface 18 of the sealing ring 10 when that nose is in initial assembled, seal-forming position in the counterbore 36. In such initial position the surface 18 has clearance with the inner sealing edge 40. However, it is to be understood that our invention includes and considers as the equivalent of the illustrated embodiment, a reversely functioning arrangement in which the primary or first-line seal is constituted by the inner sealing edge 40 and is engaged initially with the nose piece of member 10 when that nosepiece is inserted in assembled, seal-forming relation with the coupling member C. Such reverse functioning of the seals, is effected merely by decreasing the internal diameter of the inner edge 40 and increasing the angle of the inclined surface 18 of the nose portion of ring 10 to in effect sharpen the nose, so that, when the ring member 10 is inserted into assembled, seal-forming position in the coupling member C, the edge 40 will first engage surface 18 of member 10, with the surface 18 being held out of engagement initially with the outer sealing edge 38. Thereafter, upon wear, deformation or disruption of the engaged surfaces 40 and 18 to a sufficient extent, the ring member 10 may then be forced inwardly to engage surface 18 with the edge 38, so that, these outer elements then constitute the secondary or reserve seal rather than the inner elements as in the illustrated form.

In a modified form of our invention as illustrated in Fig. 5, we have provided the conical nose portion of the sealing ring 10 of a spherical external contour in which the inclined surface 18' has a radius to form such surface as axially convex. This form of nosepiece is so dimensioned, and the surface 18' has such a radius, that upon insertion of the nosepiece in the counterbore 36 of the coupling member C, the primary sealing edge 39 and the secondary sealing edge 40 are initially engaged in seal-forming contact with and around surface 18' so that there is formed a double seal for the connector. This modified form of the invention thus embodies that feature of concentric but axially spaced, annular sealing edges formed in and around the passage through the coupling body 30 for sealing engagement with the spherical type of nosepiece providing the axially convex surface 18' therearound. Preferably, as in the form of the invention of Figs. 1 to 4, the nose member or sealing ring 10 is formed of a material, such as tellurium brass which is softer than the material of which the sealing edges of the coupling member are formed.

While the coupling members C of the illustrated examples are of the female type, it will be evident to those familiar with the art that couplings of the male type may be used to meet varying installation conditions, as may be desired or found expedient.

It will also be evident that various modifications, substitutions, eliminations, and additions may be resorted to without departing from the broad spirit and scope of our invention, and hence, we do not desire or intend to limit the invention in all respects to the exact disclosures of the specific examples thereof herein presented, except as may be required by specific, intended limitations thereto in certain of the claims hereto appended.

What we claim, is:

1. A connector including, in combination; a coupling member having an axial bore providing a flow passage therethrough; said coupling member being formed to provide within said bore axially spaced, annular sealing edges therearound adjacent but spaced inwardly from one end of said member; the outermost of said sealing edges having an internal diameter greater than the internal diameter of said innermost sealing edge; a preformed substantially rigid, shape sustaining ring member having an axial bore providing a flow passage therethrough; said ring member having means at one end for attachment to a tube and at the other end thereof having a conical sealing surface therearound converging toward the end thereof opposite said tube attachment end; said ring member being adapted to be connected to said coupling member in initial seal forming position with the conical nose portion extended into the end of the bore of said coupling member adjacent said annular sealing edges and with the conical surface of said nose piece in sealing engagement with at least the outermost of said sealing edges; means for forcing said ring member into connected, initial sealing position on said coupling member and for releasably securing said members in such connected position; and said means being also adapted to force said ring member inwardly from initial sealing position in sealing engagement with only said outermost sealing edge to a second sealing position also engaged and forming a seal with said innermost, smaller diameter sealing edge.

2. A connector including, in combination; a coupling member having an axial bore therethrough; said coupling member being formed at one end thereof to provide an annular, outwardly tapered surface surrounding and forming the opening of said bore through said member end; said surface providing an annular sealing edge around its inner end within said bore; a preformed substantially rigid ring member having an axial bore therethrough having means at one end for attachment to a tube and at the opposite end thereof having a conical nose portion having externally therearound a conical sealing surface converging toward the latter end of said ring member; the angle of inclination of said conical surface of said nose portion being greater than the angle of inclination of said outwardly tapered surface surrounding the end of said coupling member bore; said ring member being adapted to be connected to said coupling member in position with the conical nose portion thereof extended through the tapered end of said coupling member bore with the conical sealing surface of said substantially rigid nosepiece in sealing engagement with said annular sealing edge formed in the coupling member bore; and means for forcing said ring member to and releasably securing said member in connected, seal forming engagement with said coupling member.

3. A connector including, in combination; a coupling member having an axial bore therethrough; said coupling member being formed to provide within said bore axially spaced, annular sealing edges therearound adjacent but spaced inwardly from one end of said member; the outermost of said edges having an internal diameter greater than the internal diameter of the innermost of said edges; a preformed substantially rigid ring member having an axial bore therethrough; said ring member having means at one end for attachment to a tube and at the opposite end thereof having a tapered nose portion having therearound a tapered sealing surface converging toward said latter end; said substantially rigid ring member being adapted to be connected to said coupling member in position with the tapered nose portion extended into the end of the bore of said coupling member adjacent said sealing edges with the tapered surface of said nose piece in sealing engagement with and bridging the space between said edges to form a multiple seal; and means for forcing said ring member to and securing the same in connected, seal forming position on said coupling member.

4. A connector including, in combination; a coupling member having a main axial bore therethrough provided with an enlarged diameter counterbore opening through one end thereof; said coupling member having at the outer end of said counterbore a radially outwardly inclined annular surface therearound forming around its inner end an annular sealing edge; said coupling member having around the inner end of said counter-bore a second radially inwardly inclined annular surface therearound forming with the wall surface surrounding the main bore a second annular sealing edge spaced inwardly from and of smaller diameter than the diameter of said first edge; a preformed substantially rigid ring member provided with an axial bore therethrough having means at one end thereof for attachment to a tube and at the opposite end thereof having a tapered nose portion providing therearound a tapered sealing surface converging toward said latter end; said ring member being adapted to be connected to said coupling member in initial seal forming position with the tapered nose portion thereof extended into the counterbore of said coupling member with the tapered sealing surface of said nosepiece in sealing engagement with at least one of said sealing edges within said coupling member bore; said ring member being adapted to be forced inwardly from said initial position to a second position with the nose portion of said ring member also in seal forming relation with the other of said sealing edges; and means for connecting and forcing said irng and coupling member to and securing the same in said initial and said second seal forming positions.

5. In combination a flexible tube, a preformed substantially rigid ring member having an axial bore therethrough secured in fixed position on an end of said tube concentric therewith; said ring member having a tapered nosepiece providing therearound a tapered sealing surface converging toward the end of said ring member opposite said tube; a coupling member having an axial bore therethrough; a coupling sleeve rotatably confined on said tube in rotatable engagement with said ring member at the inner side of said nosepiece; said coupling member being formed to provide axially spaced, annular sealing edges within said bore adjacent one end thereof with the outermost of said edges having an internal diameter greater than the internal diameter of the innermost of said edges; said coupling member being adapted to be connected to said ring member with the nosepiece of said ring member being extended into the bore of said coupling member in initial seal forming position with the tapered surface of said nosepiece being engaged with one only of said sealing edges and in a second sealing position in engagement with a plurality of said sealing edges; and said coupling sleeve and said coupling member being formed for threaded engagement for rotation of the coupling sleeve to draw said coupling member and ring member tightly together in seal forming connection on the end of said tube with said ring member being engaged in said initial seal forming position or said second seal forming position.

6. In a connector, in combination, a preformed substantially rigid ring member an axial bore therethrough and having means at one end thereof for attaching said ring member in fixed position on and concentric with the end of a tube; said ring member having at its outer end a tapered nose portion having a tapered sealing surface therearound converging toward said outer end and an annular sealing edge around the outer end of said nose portion; a coupling member having an axial bore therethrough and having within said bore an annular sealing edge therearound adjacent but spaced from one end of the bore and an annular sealing surface therearound spaced axially inwardly from said sealing edge of smaller internal diameter than the internal diameter of said latter sealing edge; said ring member being adapted to be connected to said coupling member in an initial sealing position with said ring member nose portion extended into the end of said coupling member bore adjacent said sealing edge therewithin and with the tapered surface of said nose portion being in sealing engagement with the sealing edge and with the end sealing edge of said nose member being positiond in immediate proximity to but having slight clearance with said annular sealing surface within said coupling member bore; and means for forcing said ring and coupling member together in initial sealing position and for forcing said ring member further into said coupling member to engage the end sealing edge of the ring member nose portion with said annular sealing surface.

7. In a connector, in combination; a preformed substantially rigid ring member having an axial bore and provided at one end with means for mounting it in fixed position on and concentric with the end of a tube; said ring member having a conical nose portion at the outer end thereof having therearound a conical sealing surface converging toward said outer end; a coupling member having an axial bore therethrough and being formed to provide adjacent but spaced from one end of said coupling member, axially spaced sealing edges in and concentric with said bore; the outermost of said sealing edges having an internal diameter greater than the innermost of said edges; said ring and coupling member being adapted to be connected together in initial sealing position with the conical nose portion of said ring member being extended into the bore of said coupling member and with the conical surface of said nose portion in sealing engagement with the outermost of said sealing edges and with the end of said conical nose portion being in immediate proximity to but having clearance with said innermost sealing edge; and means for drawing said members together and securing the same in connected, initial seal-forming position.

8. A connector including, in combination; a coupling member having an axial bore therethrough; said coupling member having within said bore axially spaced, annular sealing edges therearound projecting radially inwardly thereinto; a preformed substantially rigid ring member having an axial bore therethrough; said ring member having at one end thereof means for attaching said ring member to a tube and at the opposite end having a tapered nose portion having externally therearound a tapered sealing surface converging toward the adjacent end of said ring member; the material of which said annular sealing edges within said coupling member is formed having a degree of hardness greater than that of the material of which the tapered sealing surface around said nose portion of said ring member is formed; said ring member being adapted to be connected to said coupling member in axial alignment therewith at one end thereof with said tapered nose portion extended into the bore thereof in contact with one of said sealing edges; means for forcing said ring member inwardly to an initially sealed position with at least one of said sealing edges in sealing engagement in the softer material of said nose portion; and said means being also adapted to force said ring member inwardly from said initial position to a second position with another of said sealing edges in sealing engagement in the softer material nose portion.

References Cited in the file of this patent

UNITED STATES PATENTS

| Number | Name | Date |
|---|---|---|
| 1,959,079 | Holt | May 15, 1934 |
| 1,969,142 | McIntyre | Aug. 7, 1934 |
| 2,025,382 | Fletcher et al. | Dec. 24, 1935 |
| 2,069,177 | Craver | Jan. 26, 1937 |
| 2,278,754 | Wolcott | Apr. 7, 1942 |
| 2,330,864 | Bruno | Oct. 5, 1943 |
| 2,350,017 | Davis | May 30, 1944 |
| 2,405,822 | Franck | Aug. 13, 1946 |
| 2,497,274 | Richardson | Feb. 14, 1950 |

FOREIGN PATENTS

| Number | Country | Date |
|---|---|---|
| 579,145 | Great Britain | July 24, 1946 |